(No Model.) 3 Sheets—Sheet 2.
N. N. VROMAN.
WIND WHEEL.
No. 516,618. Patented Mar. 13, 1894.
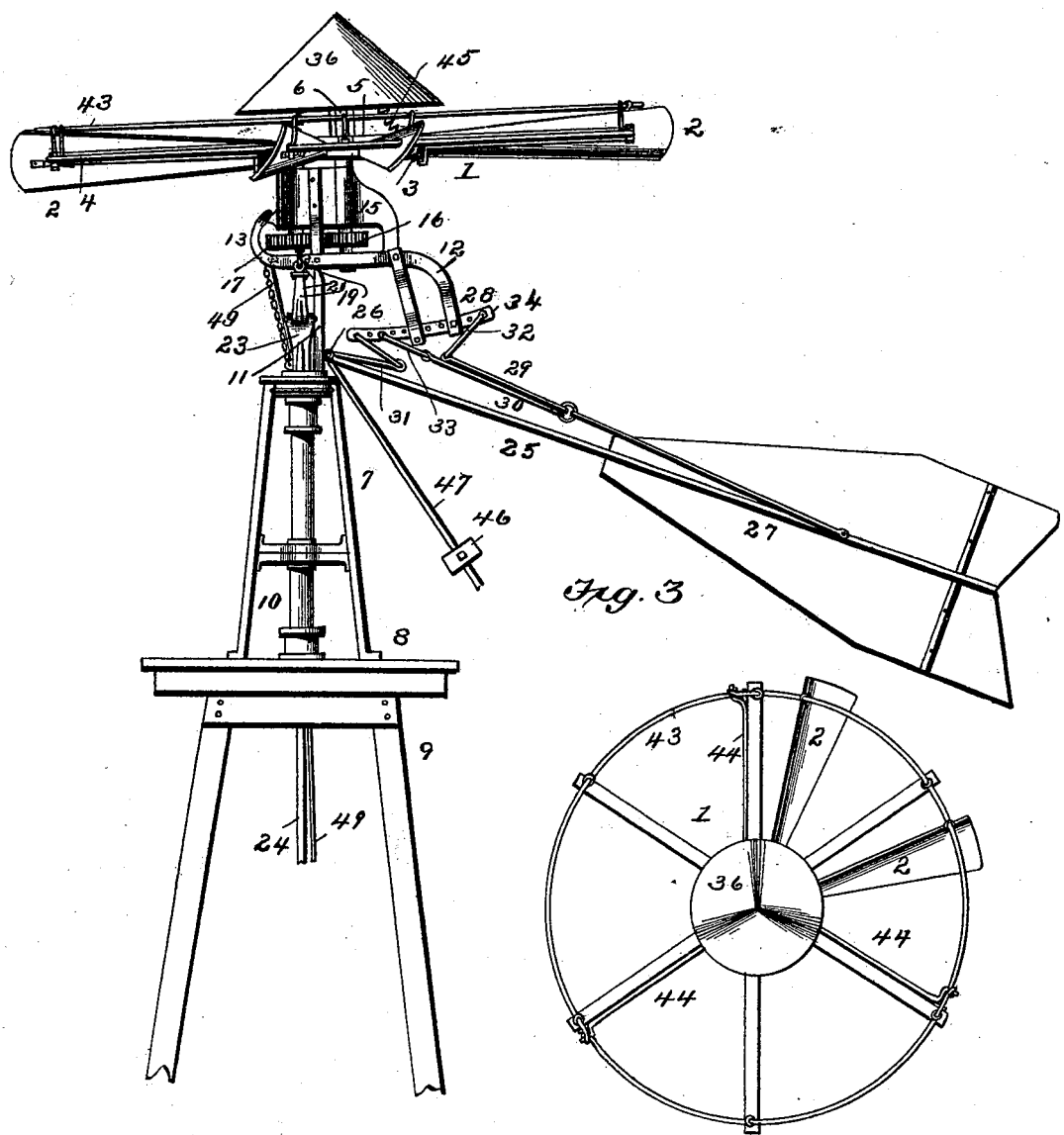
Witnesses
John Drivie
Geo. F. Kincaid
Inventor
Nordil N. Vroman
by John Wedderburn
Attorney (No Model.) 3 Sheets—Sheet 3.
N. N. VROMAN.
WIND WHEEL.
No. 516,618. Patented Mar. 13, 1894.
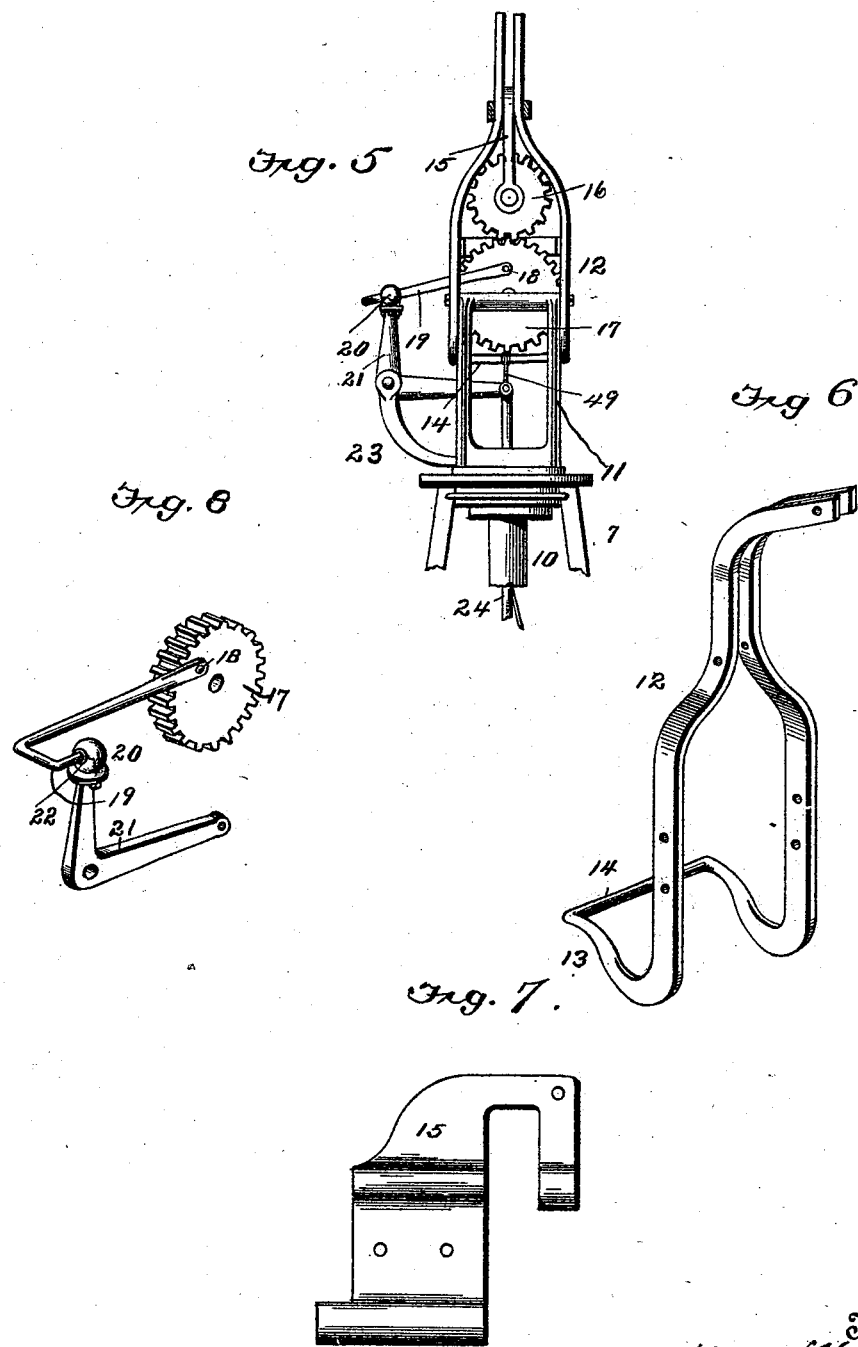

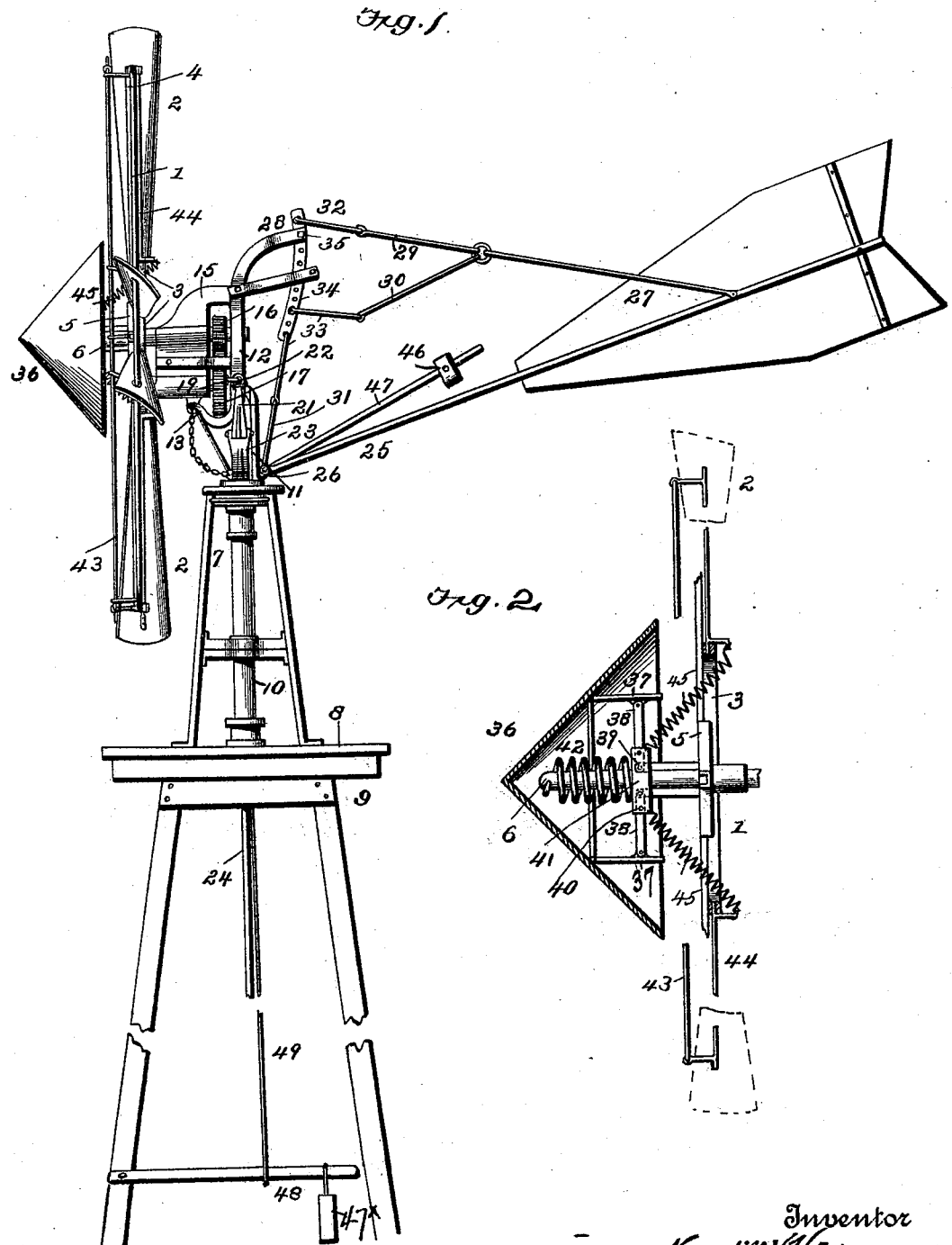

UNITED STATES PATENT OFFICE.

NORDILL N. VROMAN, OF WINSIDE, NEBRASKA.

WIND-WHEEL.

SPECIFICATION forming part of Letters Patent No. 516,618, dated March 13, 1894.

Application filed March 2, 1893. Serial No. 464,393. (No model.)

*To all whom it may concern:*

Be it known that I, NORDILL N. VROMAN, of Winside, in the county of Wayne and State of Nebraska, have invented certain new and useful Improvements in Wind-Wheels; and I do hereby declare the following to be a full, clear, and exact description of the invention, such as will enable others skilled in the art to which it appertains to make and use the same.

This invention relates to improvements in wind-mills, and it has for its object to provide a device of this class which shall possess superior advantages in point of resisting the force of the wind and relieving itself of the strain occasioned by sudden gusts of wind, as well as simplicity of construction, inexpensiveness and general efficiency.

My invention, however, comprehends another object, and that is to supply novel means for automatically causing the area of wind resisting surface to vary with the velocity of the wind in an inverse proportion. Further novelty resides in the peculiarities of construction, and the combinations, arrangements, and adaptation of parts, all as more fully hereinafter described, shown in the drawings, and then particularly pointed out in the appended claims.

The invention is clearly illustrated in the accompanying drawings, which, with the figures of reference marked thereon, form a part of this specification, and in which—

Figure 1 is a vertical elevation of my improved wind mill, in an operative position. Fig. 2 is a section of the wheel taken through the center of the shaft thereof. Fig. 3 is a front elevation of a portion of the wheel. Fig. 4 is a vertical elevation of the mill, showing the position occupied by the wheel during a wind of violent velocity. Figs. 5, 6, 7 and 8 are enlarged views of details.

Reference being had to the above figures, 1 represents the wind wheel the fans 2 of which are pivoted at one end to the inner metal ring 3 and at or near the other end to the outer metal ring or band 4; the metal rings being secured in the proper position by means of the metal spokes 5 which are rigidly secured to shaft 6.

Before going into the details of construction of the governor mechanism, I will describe in detail the relative positions of the parts composing the pumping mechanism and the position and operation of the vane.

Revolubly secured, in a vertical position, to the iron frame work 7 which is in turn rigidly mounted on the platform 8 of the trestle work 9, is the metal tube 10 to the upper end of which is rigidly secured the support 11. Pivoted to the upper end of the support 11 is the Y-shaped frame 12 shown in perspective in Fig. 6, the forked arms of which are bent backward to form the hooks 13 the ends of the latter of which are connected by means of the cross bar 14. Rigidly secured to the frame 12 by means of suitable brace bars and bolts is the casting 15, shown in detail in Fig. 7 which is adapted to afford a suitable bearing for the shaft 6 of the wind wheel. To the inner end of the shaft 6 is secured the pinion wheel 16, the teeth of which mesh with those of the gear wheel 17, the shaft of the latter of which is adapted to revolve in a suitable bearing formed on the lower portion of the casting 15. Pivoted to the wrist pin 18 on the gear wheel 17 is the L-shaped pitman rod 19, the end of the bent portion of which bears the spherical enlargement 20 which is loosely secured to the pivoted L-shaped lever 21 by means of the cup or corresponding shaped spherical pocket 22 thus forming a ball and socket joint. The above mentioned L-shaped lever 21 is pivoted to an upwardly extending bracket or frame 23 rigidly secured to the upper extremity of the tube 10; the inner end of the lever 21 being connected to a suitable pump at the base or the trestle work 9 by means of the connecting rod 24 which passes through the tube 10. The arm 25 of the vane is pivoted to the frame 11 at the point 26 while the central portion of the blade 27 of the vane is connected to the upper end 28 of the frame 12 by means of a series of connecting rods 29, 30, 31, 32, 33, the two latter being pivoted to the adjustable bar 34 which is pivoted to the frame 12 at point 35.

It is obvious that when the wind wheel is caused to revolve by the action of the wind, its motion is transmitted to the gear wheel 17, which in turn imparts its motion, through the L-shaped pitman rod 19 to the L-shaped lever 21, thus causing the latter to oscillate and consequently operating, through the connecting rod 24, the above mentioned pump. It is also obvious that the action of the wind on the above described vane causes the tube 10 and consequently the entire mechanism secured to the upper portion thereof, as well as the wind wheel to follow its course. The following is a detailed description of the construction and operation of its mechanism for regulating the amount of resisting surface presented to the wind.

Immediately in front of the projecting end 35 of the shaft 6 is the cone shaped governor cap 36 to the inner surface of which are pivoted the arms 37, to the free ends of which are pivoted the long arms of the levers 38 which are fulcrumed to the shaft 6 at the points 39 and pivoted at points 40 to the sliding sleeve 41. Encircling the end of the shaft 6 is the coiled spring 42 one end of which is secured to the shaft while the other end is secured to the sliding sleeve 41. Joining the outer edge of each of the pivoted blades 2 of the wind wheel 1 is the wire 43, and it is therefore obvious that when one of the blades is caused to revolve the remaining ones are revolved a corresponding amount. Extending outward in radial lines and pivoted to the inner and outer bands 3 and 4 are the rods 44 their outer ends being bent at right angles and connected to the wire 43, while their inner ends are crank shaped and connected to the sliding sleeve 41 on the shaft 6 by means of the coiled springs 45.

It is obvious from Figs. 1 and 2 that as the velocity of the wind increases the cone shaped cap 36 is forced in a direction toward the wind wheel, consequently transmitting its motion, through the levers, 38, to the sleeve 41, which is caused to slide along the shaft 6 in a direction toward the hub of the wind wheel, thereby diminishing the tension of the springs 45 and allowing the blades of the wheel 1 to "feather." As the velocity of the wind becomes less the cap 36 is caused, by means of spring 42, to assume a position more remote from the hub of the wheel, and consequently causing the blades of the wheel to present a greater area of resisting surface to the wind.

When the velocity of the wind becomes high enough to threaten the destruction of the wheel, the weight 46 on the arm 47, and weight $47^\times$ on the pivoted lever 48 which is connected to the frame 12 by means of the wire rod 49, which have been previously adjusted, are overcome, and the pivoted frame 12 and consequently the wind wheel are caused to swing backward until the latter has assumed a horizontal position, shown in Fig. 4, the area of resisting surface being reduced to a minimum. As the wind subsides the weight on the lever 48 causes the wind wheel to assume its original and normal position shown in Fig. 1.

It is obvious that when it is desired to throw the mill out of operation the weight on lever 48 is removed and the wind wheel assumes the position shown in Fig. 4. This operation is due to the fact that the action of the weight $47^\times$ is greater than and overcomes the action of the weight 46 to keep the wheel in the position shown in Fig. 1, and when the weight $47^\times$ is removed or disconnected, and the weight 46 only remains in operation, the wheel is thrown over as shown in Fig. 4 because said weight 46 united with that of the vane is greater than the weight of the wheel.

The construction and arrangement of the several parts of my wind mill, being thus made known, the operation, and the advantages of the same will, it is thought, be readily understood.

I am aware that changes in the form and preparation of parts of the device herein shown and described as an embodiment of my invention can be made without departing from the spirit or sacrificing the advantages thereof, and I therefore reserve the right to make such changes and alterations as fairly fall within the scope of my invention.

Having thus described my invention, what I claim is—

1. In a wind wheel, the combination of a revoluble metal tube, a support 11 rigidly secured thereto, a Y-shaped frame pivoted to the upper end of said support having the ends of its arms connected by a cross bar, a casting 15 secured to the said Y-shaped frame, the wheel shaft and wheel, the operating gears, a vane having an arm pivotally connected to the support 11, an adjustable bar 34, a series of connecting rods 29, 30, 31, 32 and 33, the two latter being pivoted to the bar 34 the arm 47 pivoted to the upper support 11, and having a weight 46 thereon, the wire rod 49 attached at its upper end to the Y-shaped frame, an arm 48 to which the lower end of said rod 49 is attached, a weight $47^\times$ on said arm 48, and the pump rod, substantially as described.

2. In a wind mill, the combination of a support, a revoluble metal tube holding said support, a Y-shaped frame pivoted to the upper end of said support, a wheel casting secured to the Y-shaped frame, a vane pivotally attached to said support, a weighted arm connected to said vane, a wheel and gearing, adjustable means for connecting the upper portion of the Y-shaped frame to the vane, a wire rod attached to the Y-shaped frame, and a weighted arm secured to the lower end of said wire, substantially as described.

3. In a wind wheel the combination of a support, a revoluble metal tube holding said support, a Y-shaped frame pivoted to the upper end of said support, a wheel casting secured to the Y-shaped frame, a vane pivotally attached to said support, a weighted arm connected to said vane, a wheel, a shaft on which said wheel is mounted a gear 16 on said shaft, a lower gear 17, a pitman 18, secured to said gear 17, and having a ball on its opposite end, a bell crank lever 21 having a socket on the end of one arm to receive said ball, a plunger rod attached to the other arm, a wire rod 49, and a weighted arm 48, substantially as described.

4. In a wind wheel, the combination with the wheel shaft and feathering blade wheel, of the cone shaped cap, the sliding sleeve, and levers connecting the sleeve and cap, and springs connecting the sleeve and blades of the wheel, substantially as shown and described.

5. In a wind wheel, the combination with a wheel shaft, and feathering blade wheel, of the cone shaped cap, the sliding sleeve and levers, the coil spring 42, the wire rods 43 and 44, and the coil springs 45 connecting the sleeve and blades, substantially as shown and described.

In testimony whereof I have signed this specification in the presence of two subscribing witnesses.

NORDILL N. VROMAN.

Witnesses:
M. H. DODGE,
P. F. PANABAKER.